May 8, 1928. 1,668,809

W. S. JAMES

DECELEROMETER OR THE LIKE

Filed June 30, 1926 2 Sheets-Sheet 1

INVENTOR.
WILLIAM S. JAMES
BY Parker & Burton
ATTORNEY.

May 8, 1928.  1,668,809
W. S. JAMES
DECELEROMETER OR THE LIKE
Filed June 30, 1926  2 Sheets-Sheet 2
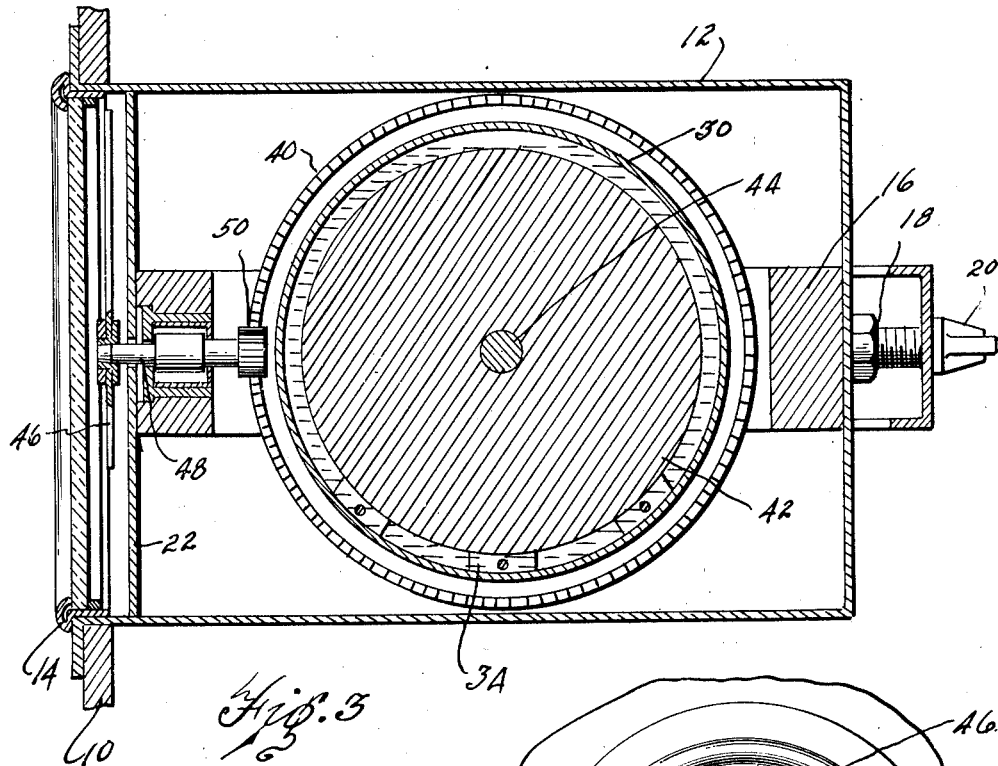
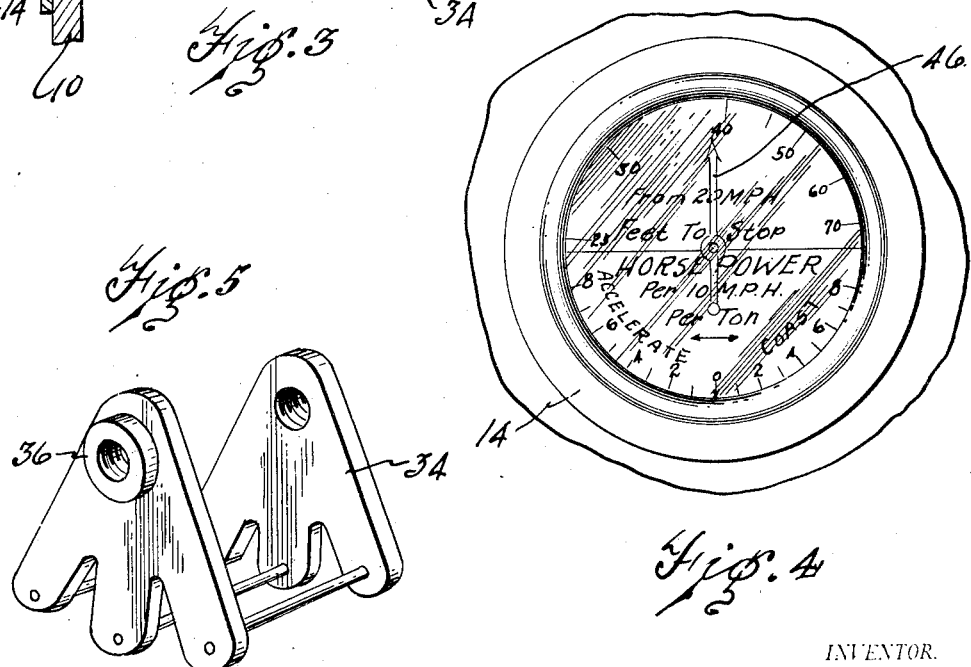
INVENTOR.
WILLIAM S. JAMES
BY
Parker & Burton
ATTORNEY.

Patented May 8, 1928.

1,668,809

UNITED STATES PATENT OFFICE.

WILLIAM S. JAMES, OF BERKELEY, CALIFORNIA.

DECELEROMETER OR THE LIKE.

Application filed June 30, 1926. Serial No. 119,561.

My invention relates to improvements in measuring instruments adapted to register in desired units forces acting on the supports for such instruments. Accelerometers and decelerometers for vehicles are instruments of this class.

I have here shown my invention as embodied in a decelerometer adapted to measure the rate of deceleration of a vehicle to determine the braking force applied thereto by the brake mechanism with which the vehicle is equipped.

An object is to provide a simple, rugged, inexpensive instrument adapted for universal application to motor vehicles and capable of quickly and accurately responding to changes in the velocity of a vehicle to rapidly and correctly indicate the deceleration or acceleration, as the case may be, in terms of desired units of measurement.

My decelerometer is so constructed as to quickly and positively indicate in desired units of measurement the force applied to a vehicle, such as the braking force, in suitable terms, such as the number of feet required to stop from a given rate of travel and without the aid of additional information obtained from any other measuring device, such as a speedometer.

I employ a pendulum suspended from a suitable support on the vehicle. A change in rate of travel of the vehicle swings the pendulum about its support and the arc of swing of the pendulum is measured to obtain the desired reckoning. In order that the response of the pendulum may be quick and accurate it is necessary that it be properly damped, and I have found fluid damping to be the most effective. My invention relates primarily to the improved fluid damping of the pendulum. If properly damped when the brakes are applied to the vehicle and the support for the pendulum slows down as the vehicle is retarded, the pendulum will swing forward until the moment of the retarding force about its point of support equals the moment about the same point of the force of gravity, and the pointer which is actuated by the pendulum will swing directly without oscillating back and forth to the reading on the scale to be indicated.

If undamped the pendulum would swing so rapidly over the first part of its path of travel as to pass beyond its position of equilibrium, it would oscillate and the reading would be slowly obtained.

A difficulty in the employment of liquid damping has been leakage of the damping fluid and the changes in the properties thereof, each of which affects the accuracy of the instrument.

An important feature of my improvement consists in providing an instrument wherein the liquid is kept permanent and constant as to quantity and condition. In my improvement it is possible to employ a relatively small quantity of a light volatile liquid wherein the damping is produced more by a turbulence of the liquid than by its viscosity and the effect of temperature changes is materially minimized.

In the drawings,—

Fig. 3 is a sectional view taken on line 3—3 of Fig. 1.

Fig. 4 is an elevation of the face of the dial.

Fig. 5 is a perspective of the unhoused pendulum which serves as a support for the balanced member.

Figure 1:
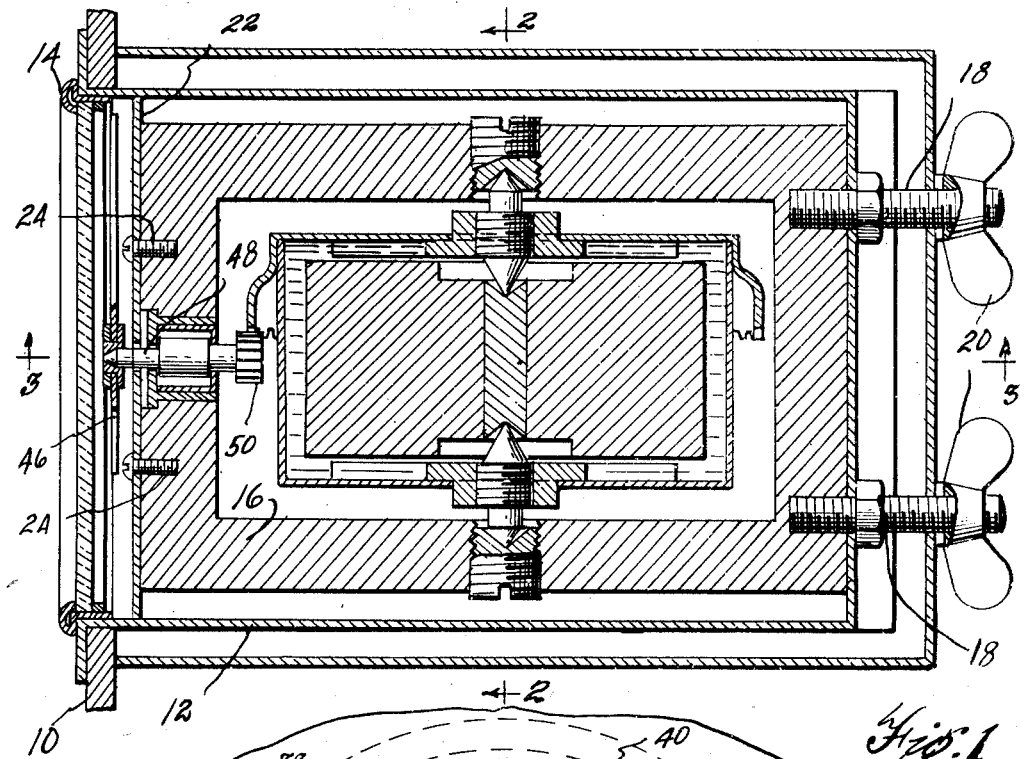
Figure 1 is a cross-sectional view through my improved device.
Figure 2:
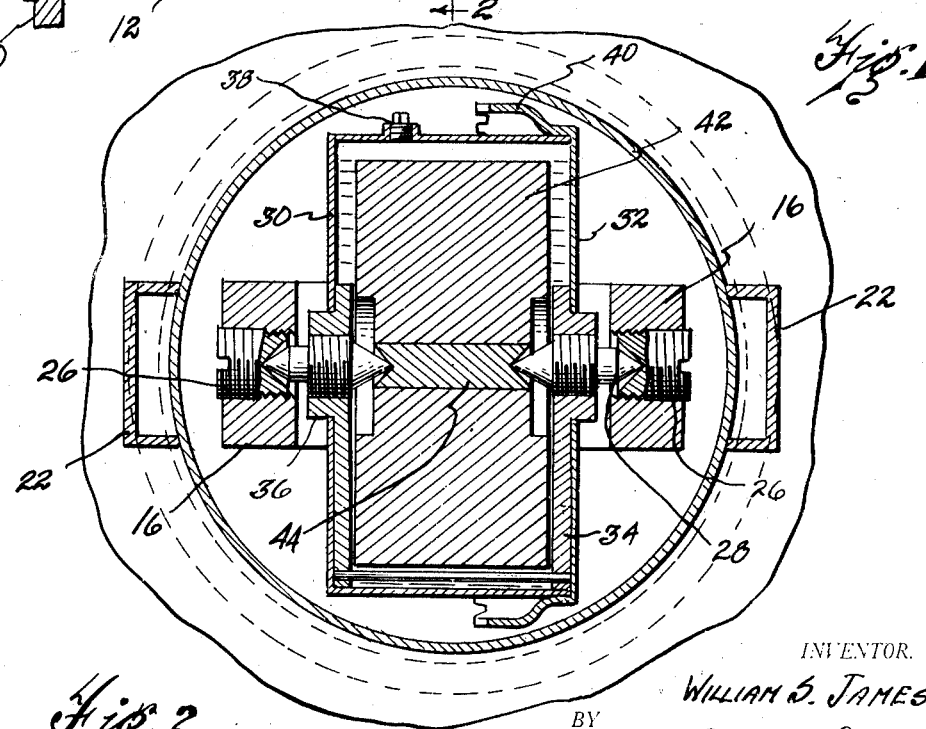
Fig. 2 is a sectional view taken on line 2—2 of Fig. 1.

My instrument is mounted at a suitable place upon the vehicle, the velocity changes of which are to be measured. It may be portable and placed on the floor of the vehicle or it may be permanently mounted upon the instrument board thereof, which in Figs. 1 and 3 would be indicated by the numeral 10. If mounted upon the instrument board it would be disposed within a suitable housing 12 and provided with a suitably positioned reading dial indicated in assembly as 14.

Within the housing a supporting frame 16 is held in place by the bolts 18 having thumb nuts 20. At the opposite end of the frame is the dial plate 22 secured in place by screws 24, which also position the frame within the housing.

This frame 16 supports a hollow liquid carrying pendulum annular in shape and here shown as formed in two telescoped sections 30 and 32. Bearings 26 are provided in opposite sides of the frame, each bearing being hollowed out to form a suitable pivotal support for a tapered pivot pin 28.

A frame 34 is mounted within the pendulum. This frame has portions 36 which fit within openings provided in the sections 30 and 32 and into which the pivot pins 28 are threaded to be carried thereby. A suitable inlet opening 38 is provided. The pendulum is sealed and it is weighted by the frame 34.

The pendulum carries a peripheral gear 40, here formed on section 32.

Mounted within the pendulum is a balanced annular damping member 42 provided with an axial bearing 44 hollowed out at each end to receive the pointed ends of the pivots 28 so that the damping member is pivotally supported in a balanced state within the interior of the pendulum.

The pendulum is filled with a suitable fluid, such as a light oil, which serves to damp its swing relative to the balanced damping member 42. The pendulum comprising the casing, members 30 and 32, and the frame 34 is unbalanced, thereby being capable of pendulous oscillations.

Indicating apparatus is associated with the pendulum and comprises a pointer 46 mounted upon a suitably supported pivot 48. The pivot carries a pinion 50 enmeshed with the gear 40 on the pendulum case so that the swing of the pendulum is transmitted to the pointer.

When the velocity of the vehicle equipped with my device is changed either in acceleration or deceleration the pendulum swings. This motion is transmitted to the pointer and is indicated on the reading dial. The swing of the pendulum is dampened by the viscosity of and the turbulence created in the contained fluid. The damping member 42 being balanced and the pendulum being unbalanced, the pendulum swings with respect to the member 42, seeking its equilibrium. Due to the damping it swings aperiodically rather than oscillating back and forth.

The damping fluid is hermetically sealed within the pendulum against any possible leakage or any change in its condition due to exposure to the atmosphere and remains substantially constant in condition and quantity. As a result the operation of the device is substantially constant throughout a long period of time.

The dial is provided with graduations to indicate in desired units the information to be obtained. In Fig. 4 the upper half of the dial is graduated to indicate the number of feet required to stop upon the application of a braking force from a travel speed of twenty miles per hour. Were the stop made from twenty miles per hour and a constant rate of slowing down of ten miles per hour per second maintained the stop would be made in two seconds. If stops were always made from twenty miles per hour the instrument could be graduated to read "Feet to stop from 20 miles per hour."

Actually I have found that the rate of stopping varies but slightly with change in speed. The tests need not, therefore, be made from a speed of exactly twenty miles per hour but may vary from fifteen to twenty-five miles per hour or even more, and the reading of the instrument "30 feet to stop from 20 miles per hour" would be correct, i. e., if the car were stopping from a speed of twenty miles per hour it would have stopped in thirty feet. If the speed had not been exactly twenty miles per hour but twenty-two miles per hour, the distance to stop would have been forty instead of thirty feet. Had the initial speed been eighteen miles per hour instead of twenty miles per hour the distance required for a stop would have measured twenty-seven instead of thirty feet. In each of the latter cases the instrument would have read "30 feet to stop from 20 miles per hour." Therefore, the advantage of my decelerometer in the inspection of brakes is readily apparent. The accuracy of the car speedometer is of no consequence when my decelerometer is used, but is of vital importance when the actual distance required to stop is measured.

The decelerometer may be employed to measure other forces acting upon the car, such as the resisting forces of wind, tires, wheel bearing friction, frictional gear losses, dragging brakes, etc. The magnitude of the sum of all of these forces would ordinarily be from one-tenth to one-twentieth of the actual maximum braking force, and they represent the force necessary to propel the car as a vehicle on a level road at a constant speed. In the adjustment of the brakes they are frequently so adjusted that they may be said to drag. This is an undesirable result and it may be determined through the use of my decelerometer by allowing the car to drift with the clutch disengaged and measuring its deceleration over a given piece of road at a given speed both before and after the brake adjustment.

The reading scale may also be graduated as illustrated to indicate the horse power applied to drive the vehicle per ton of weight and per a given mileage per hour or in terms of any unit of car weight and at any fixed speed. If graduated in terms of each 1000 pounds of car weight at ten miles per hour the total horse power required to propel the car on a level road at constant speed will be the product of the reading of the instrument, the car speed in tens of miles per hour and the weight of the car in thousands of pounds. For example, if the instrument reads 2 horse power per 1000 pounds at 10 miles per hour on a car weighing 2500 pounds and while the car is moving at 20 miles per hour, the total power output necessary to drive the car at 20 miles per hour at constant speed on a level road will be 2 × 2.5 × 2 = 10 horse power. In actual fact the reading of the instrument will change very little over the speed range from ten to twenty miles per hour so that an exact measure or reproduction of the speed for comparative purposes as in the determination of dragging brakes is unnecessary.

My decelerometer could be made to function as an accelerator by placing the zero near the center of the scale so that the instrument could be read in both directions. This acceleration scale may then be graduated in the same units in which the drifting resistance scale is graduated, i. e., "Horse power per 1000 pounds of car weight per 10 miles per hour." When the car is climbing hills or accelerating on the level this instrument will read on the acceleration scale and its reading added to the reading when drifting will give the total horse power output of the engine under the particular conditions of driving. For example, if the driver desired to check the power output of the engine at any speed, say, twenty miles per hour, he could drive at about fifteen miles per hour, then open the throttle wide and note the reading of the instrument when the car has attained a speed of twenty miles per hour. He could then disengage the clutch when the car speed had increased somewhat above twenty miles per hour, and allow the car to drift, noting the reading of the instrument as the car speed dropped through twenty miles per hour. This second reading will be on the deceleration part of the scale. If while accelerating through twenty miles per hour the instrument read four horse power per 1000 pounds of car weight at ten miles per hour, and 1.5 horse power per 1000 pounds of car weight at ten miles per hour when drifting at twenty miles per hour the total power output of the engine at a car speed of twenty miles per hour would be 5.5 × 2 × 2.5 = 27.5 horse power. My improved instrument is, therefore, adapted to many uses.

Another advantageous feature of this design of instrument is that it can be used on instrument boards set at any angle. This is because of the use of a full circle in the large gear 40. When the instrument is finally mounted in the desired position or at the desired angle it is only necessary to place the car on a level spot and loosen the pointer, allow the pendulum to come to rest and replace the pointer at the zero. The instrument calibration is unaffected by this operation.

What I claim is:

1. An instrument of the class described having a pivotally supported unbalanced fluid carrying container fluid therein, a balanced damping member pivotally supported within the fluid content of the container, and registering mechanism coupled with the container to measure its angular movement.

2. An instrument of the class described having a pivotally supported unbalanced fluid carrying container fluid therein, an annular damping member pivotally supported concentric to the pivotal axis of the container and within the fluid content thereof, and registering mechanism associated with the container to measure its angular movement.

3. In an instrument of the class described, a pivotally supported unbalanced fluid carrying container fluid therein, an annular damping member pivotally balanced within the container and within the fluid content thereof, and means associated with the container to register its angular swinging movement.

4. In fluid damped mechanism, a fluid carrying pendulum the oscillation of which is to be dampened, fluid therein, and a pendulum damping member submerged within the fluid content of the pendulum and supported so as to permit swinging of the pendulum with respect thereto.

5. In fluid damped mechanism, a hollow annular pivotally axially supported unbalanced casing provided with a fluid content, and a damping member pivotally balanced within the fluid content thereof to permit independent swinging movement of the casing with respect thereto and registering mechanism associated with the casing to measure its swinging movement.

6. In an instrument of the class described, a support, a fluid carrying pendulum pivotally suspended therefrom, fluid therein, means connected with the pendulum to record its angular swing, and a damping member pivotally suspended within the pendulum submerged within the fluid therein from a support disposed concentrically to the axis of said pendulum.

7. In an instrument of the class described, a support, a fluid carrying pendulum pivotally suspended therefrom, indicating means to record the swing of the pendulum, including a driving member adapted to travel through the greatest arc of swing of the pendulum and registering mechanism associated therewith to be driven thereby.

8. In an instrument of the class described, a support, an annular fluid damped pendulum pivotally suspended therefrom, indicating means to record the swing of the pendulum, and a gear extending about the circumference of the pendulum adapted to actuate said indicating means.

9. In an instrument of the class described, a support, a sealed pendulum containing a determined quantity of liquid, said pendulum pivotally suspended from said support for swinging movement, a damping member pivotally supported within the pendulum immersed in the liquid content thereof and means associated with the pendulum to register the angular swing thereof.

10. In an instrument of the class described, a support, a pendulum suspended from said support provided with a determined liquid content sealed therein, and a damping member pivotally suspended within the pendulum submerged in its liquid content to permit swinging movement of the pendulum relative to the damping member, said damping member being of such size as to leave a relatively small space between it and the wall of the pendulum.

11. A decelerometer having an unbalanced pivotally axially supported casing provided with a liquid content, a damping member pivotally coaxially balanced within the casing to permit relative swinging movement of the casing, a gear encircling the casing, a pinion engaging the gear, and indicating mechanism coupled with the pinion to register the angular swing of the casing.

12. An instrument of the class described having an annular pivotally supported unbalanced casing provided with a liquid content, a damping member within the casing pivotally balanced upon supports carried by opposite walls of the casing to permit relative swinging movement of the casing, and indicating mechanism coupled with the casing to register its angular movement.

13. In an instrument of the class described, an annular pivotally axially supported casing provided with a weighted portion, a damping member therein pivotally balanced upon supports carried by the casing to permit swinging movement of the casing with respect thereto, fluid within the casing about said damping member, a gear encircling the casing and indicating mechanism coupled with the gear to register the angular movement of the casing.

14. In an instrument of the class described, an annular casing axially pivotally supported, said casing comprising complementary cup-shaped sections secured together, one of said sections provided with an encircling gear, fluid within the casing, supports upon opposite sides of the casing, said casing provided with axially disposed bearings on opposite sides mounted within said supports to permit oscillation of the casing, an annular damping member within the casing pivotally mounted upon the inner ends of said axial supports to permit oscillation of the casing relative to said damping member, and registering mechanism having a part coupled with the gear of the casing to indicate the angular swing of the casing.

In testimony whereof, I sign this specification.

WILLIAM S. JAMES.